US012460614B2

(12) United States Patent
Little

(10) Patent No.: US 12,460,614 B2
(45) Date of Patent: Nov. 4, 2025

(54) MULTISTAGE CONCENTRATIVE WAVE ENERGY RECTIFIER

(71) Applicant: Cory Allan Little, Seaside, OR (US)

(72) Inventor: Cory Allan Little, Seaside, OR (US)

( * ) Notice: Subject to any disclaimer, the term of this patent is extended or adjusted under 35 U.S.C. 154(b) by 186 days.

(21) Appl. No.: 18/205,420

(22) Filed: Jun. 2, 2023

(65) Prior Publication Data
US 2023/0417213 A1 Dec. 28, 2023

Related U.S. Application Data

(60) Provisional application No. 63/354,499, filed on Jun. 22, 2022.

(51) Int. Cl.
F03B 13/18 (2006.01)

(52) U.S. Cl.
CPC ........ F03B 13/18 (2013.01); F05B 2220/706 (2013.01)

(58) Field of Classification Search
CPC ........ F03B 13/18; F03B 13/142; F03B 13/24; F05B 2220/706; Y02E 10/30
See application file for complete search history.

(56) References Cited

U.S. PATENT DOCUMENTS 4,622,473 A * 11/1986 Curry ................... F03B 13/187
60/497
7,199,481 B2 * 4/2007 Hirsch ................ F03B 13/1855
290/53

* cited by examiner

Primary Examiner — Joseph Ortega

(57) ABSTRACT

A wave energy rectifier, with multiple concentrative stages for building a head pressure that exceeds the pressure generated by a single stage. The wave energy rectifier is coupled by a pneumatic manifold to an apparatus for performing mechanical, electrical or chemical work from the potential energy of the accumulated pneumatic head pressure.

15 Claims, 11 Drawing Sheets

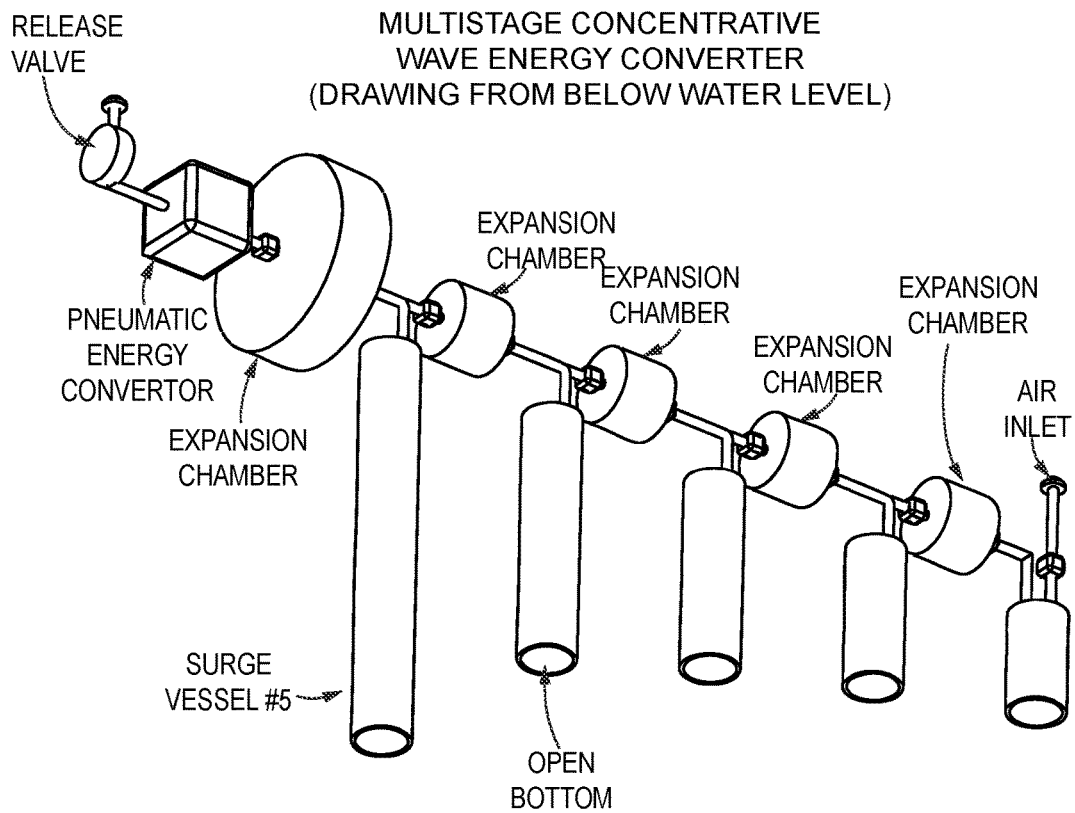
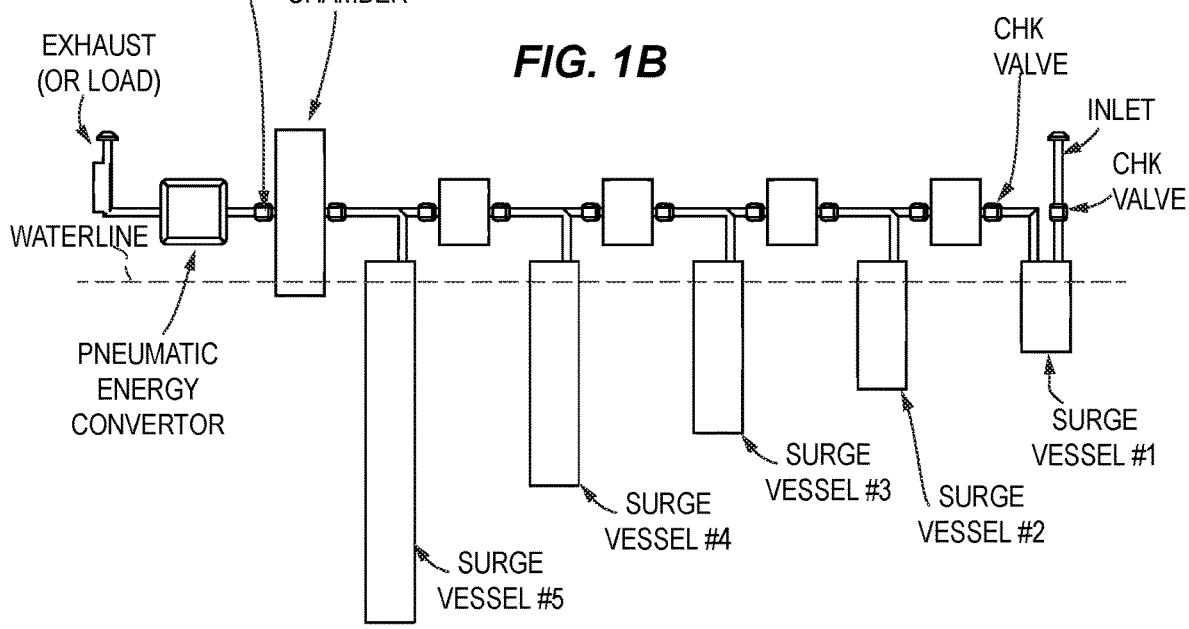

TOP-DOWN PLAN VIEW

BOTTOM-UP PLAN VIEW

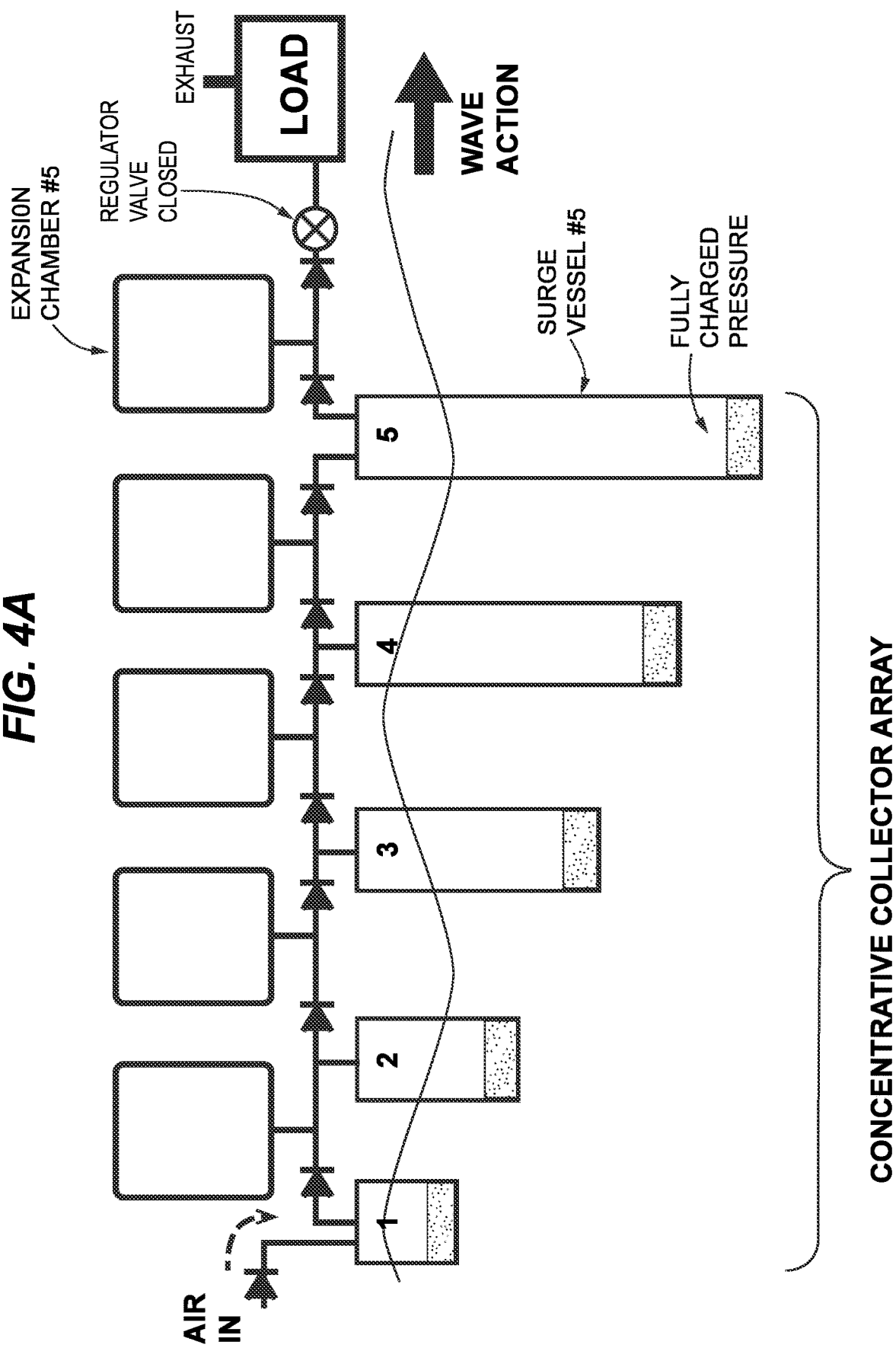

MULTISTAGE CONCENTRATIVE WAVE ENERGY RECTIFIER

TECHNICAL FIELD

This disclosure pertains generally to the field of solutions for converting ocean wave and tidal energy to electric, pneumatic, hydraulic or mechanical power.

BACKGROUND

The sun and moon power an enormous quantity of energy into the atmosphere and ocean. Much of this energy takes the form of waves and tides. When the wind blows on the surface of the ocean it produces ripples, waves, and swells. Of primary interest is the periodic swell, which is achaotic and regular in its period and amplitude.

Typical ocean waves have an average amplitude of around 1.5 m and an average wavelength of around 34 m. The wave height increases and the waves become closer together when striking a coastline. For reference, a depth of 10 meters corresponds to 1 Atm of pressure, or about 15 psi or 104 kPa. A wave having an wave height of 1 meter has a potential energy in the vertical axis corresponding to a head pressure of about 1.5 psi.

Momentum of a wave is a combination of the rate of change in amplitude plus a velocity per unit mass. Wave motion follows a circular path with progressive advance that is manifested in shore break by a cresting and run-up of the wave onto the beach. The energy of the wave at a shoreline is apparent in the surge as the wave breaks.

As known in the art, land-installed marine powered energy transformers are shoreline installations that produce power from an oscillating water column. The surge of wave action is harnessed to turn an air-driven turbine, for example. Tidal motions can also be converted to generate power. And in other art, buoyant mechanical arms that rise up and down with the waves have also been described for collecting wave energy.

However, these solutions have not succeeded in storing that energy as a pneumatic pressure or capturing cumulative momentum of the wave. For example, in one displacement-driven turbine, the turbine fan reverses direction as the wave advances and recedes. This effectively captures energy in two directions, but cannot compound the energy of a first wave additively with a second wave. A solution to this problem and related problems of efficiently capturing useful energy from waves is needed. A wave apparatus is needed that can accumulate the head pressure from succeeding waves, so as to generate a net pressure that is more than 1.5 psi per 1 meter wave, for example.

SUMMARY

Disclosed is an apparatus that traps and accumulates head pressure from succeeding waves. Wave action generates a positive head pressure at the top of each swell. An inverted vessel that is partially or fully immersed in a wave, the vessel having an internal volume, such that the volume is open at the bottom and sealed at the top (so as to be partially water-filled), will realize a pneumatic head pressure as the wave passes across the vessel and transfer that head pressure to an expansion chamber via a pipe connection. Using a pipe manifold in which a plurality of surge vessels and expansion chambers are fluidly connected through check valves, the vessels cooperatively will generate additive head pressure in the expansion chambers. With multiple vessels, such that each vessel is inverted to trap an air volume above a water volume, any head pressure resulting from passage of a swell is communicated to the trapped air volume, which is discharged through a check valve into a downstream expansion chamber. Each downstream expansion chamber that receives head pressure in the form of displaced air from upstream surge vessels will realize a pneumatic head pressure that is greater than the individual head delivered by a single vessel. By scaling this apparatus, useful pressures in the form of potential energy for performing work are obtained.

Work may take the form of mechanical action, pneumatic action, or hydraulic action in which potential energy is converted to kinetic energy. Alternatively the potential energy may be converted to stored energy in the form of compressed air, electric, or chemical energy, for example.

Compressed air has long been used to power tools and equipment, to transfer materials, and to vaporize liquids. Electricity is fully fungible as an energy source, and is capable of performing work in the form of lighting, cooking, cutting, computing, and so forth. Chemical energy may be realized, for example, by electrolysis and separation of hydrogen and oxygen such that a fuel cell may be operated remotely from the wave apparatus to recover the stored potential energy of the waves and perform useful work on demand.

The elements, features, steps, and advantages of one or more embodiments will be more readily understood upon consideration of the following detailed description, taken in conjunction with the accompanying drawings, in which embodiments, including details, conceptual elements, and current practices, are illustrated by way of example.

It is to be expressly understood, however, that the drawings are for illustration and description only and are not intended as a definition of the limits of the embodiments and conceptual basis as claimed. The various elements, features, steps, and combinations thereof that characterize aspects of the claimed matter are pointed out with particularity in the claims annexed to and forming part of this disclosure. The invention(s) do not necessarily reside in any one of these aspects taken alone, but rather in the invention(s) taken as a whole.

BRIEF DESCRIPTION OF THE DRAWINGS

One or more embodiments are taught and are more readily understood by considering the drawings in association with the specification, in which:

FIG. 1A is view of an exemplary first embodiment having a linear array of five inverted surge vessels connected by a pneumatic manifold.

FIG. 1B is an elevation view of the first embodiment showing the arrangement of surge vessels, expansion chambers, and valves, and having an inlet for receiving air and an outlet. A waterline is shown to indicate that the surge vessels are at least mostly submerged.

FIG. 4A is a schematic showing a series of waves moving along the waterline and motions of air and water in the surge vessels and piping that leads to concentration of pneumatic pressure in the single expansion chamber in a fully charged state.

Figure 1C:
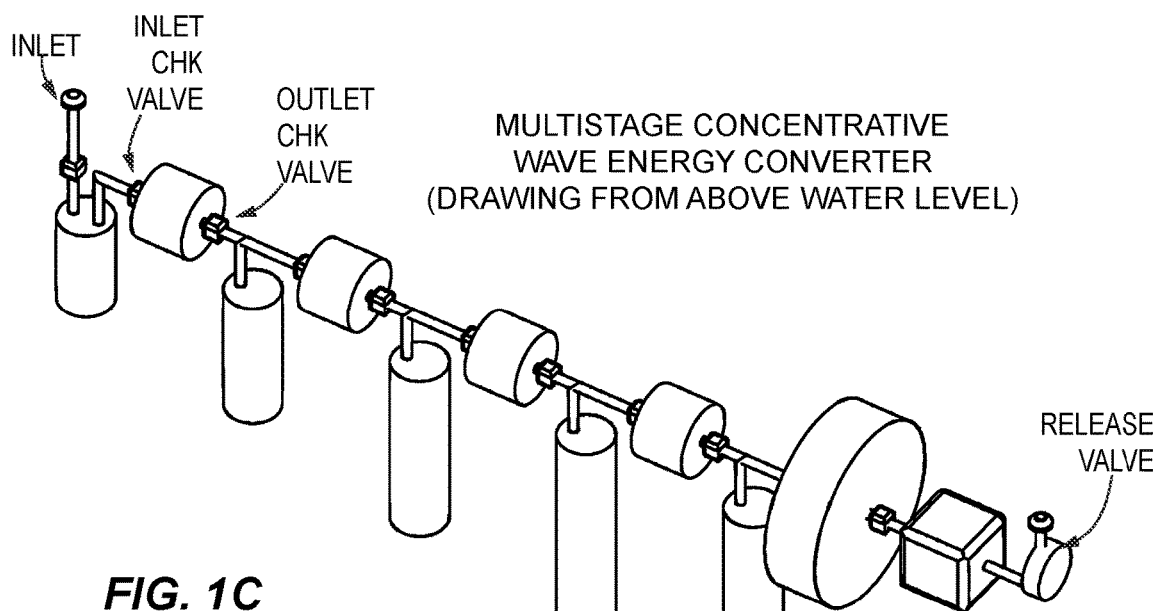
FIG. 1C is a perspective view looking down on the linear array of five surge vessels and associated pipeworks. The surge vessels are positioned between serial expansion chambers in this view. Each surge vessel has an inlet check valve and an outlet check valve.

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description and teachings disclosed herein.

Glossary

Certain terms are used throughout the following description to refer to particular features, steps, or components, and are used as terms of description and not of limitation. As one skilled in the art will appreciate, different persons may refer to the same feature, step, or component by different names. Components, steps, or features that differ in name but not in structure, function, or action are considered equivalent and not distinguishable, and may be substituted herein without departure from the spirit and scope of the this disclosure. The following definitions supplement those set forth elsewhere in this specification. Certain meanings are defined here as intended by the inventor, i.e., they are intrinsic meanings Other words and phrases used herein take their meaning as consistent with usage as would be apparent to one skilled in the relevant arts. In case of conflict, the present specification, including definitions, will control.

Unless otherwise defined, all technical and scientific terms used herein have the same meaning as commonly understood by one of ordinary skill in the art to which the subject matter described herein belongs. In case of conflict, the present specification, including definitions, will control.

"Expansion chamber" is a term of art and as used here, is a cavity or sealed vessel for receiving and containing a pressurized gas, thereby having an internal pressure that is distinct from and isolated from an external pressure.

"Surge vessel" or "displacement cavity" relates to any submersible structure or member capable of containing a pressure when immersed in a fluid body. The vessel or cavity is immersed in an inverted position so that a bottom neck or aperture is in fluid contact with the surrounding water. The water level inside the vessel will rise or fall with wave action outside the vessel, causing a pneumatic head pressure to develop in the air space at the top of the inverted vessel. This head pressure is conveyed through pipeworks and valves to an expansion chamber. The particulars of the geometry and cross-sectional shape of the surge vessel do not limit the invention.

"Pneumatic manifold" refers broadly to any manner of pipeworks or fluidic connections by which an air volume may enter the manifold, may be pressurized and displaced from one vessel to another, directs the pressurized air to a storage chamber or vessel, and ultimately is exhausted to ambient pressure.

General connection terms including, but not limited to "connected," "attached," "conjoined," "secured," and "affixed" are not meant to be limiting, such that structures so "associated" may have more than one way of being associated. "Fluidly connected" indicates a connection for conveying a fluid therethrough. "Digitally connected" indicates a connection in which digital data may be conveyed therethrough. "Electrically connected" indicates a connection in which units of electrical charge are conveyed therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of the inventive matter disclosed here. Thus, the appearances of the phrases "in one embodiment" or "in an embodiment" in various places throughout this specification are not necessarily all referring to the same embodiment and may apply to multiple embodiments. Furthermore, particular features, structures, or characteristics of the inventive matter may be combined in any suitable manner in one or more embodiments. For example, it is contemplated that features of dependent claims depending from one independent claim can be used in apparatus and/or methods of any of the other independent claims.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure. Aspex Eyewear v Marchan Eyewear 672 F3d 1335, 1349 (Fed Circ 2012). "Configured to", as used here, is taken to indicate is able to, is designed to, and is intended to function in support of the inventive structures, and is thus more stringent than "enabled to".

It should be noted that the terms "may," "can," and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this disclosure relates.

Unless the context requires otherwise, throughout the specification and claims that follow, the term "comprise" and variations thereof, such as, "comprises" and "comprising" are to be construed in an open, inclusive sense-as in "including, but not limited to." As used herein, the terms "include" and "comprise" are used synonymously, the terms and variants of which are intended to be construed as non-limiting.

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present disclosure.

DETAILED DESCRIPTION

Figure 8:
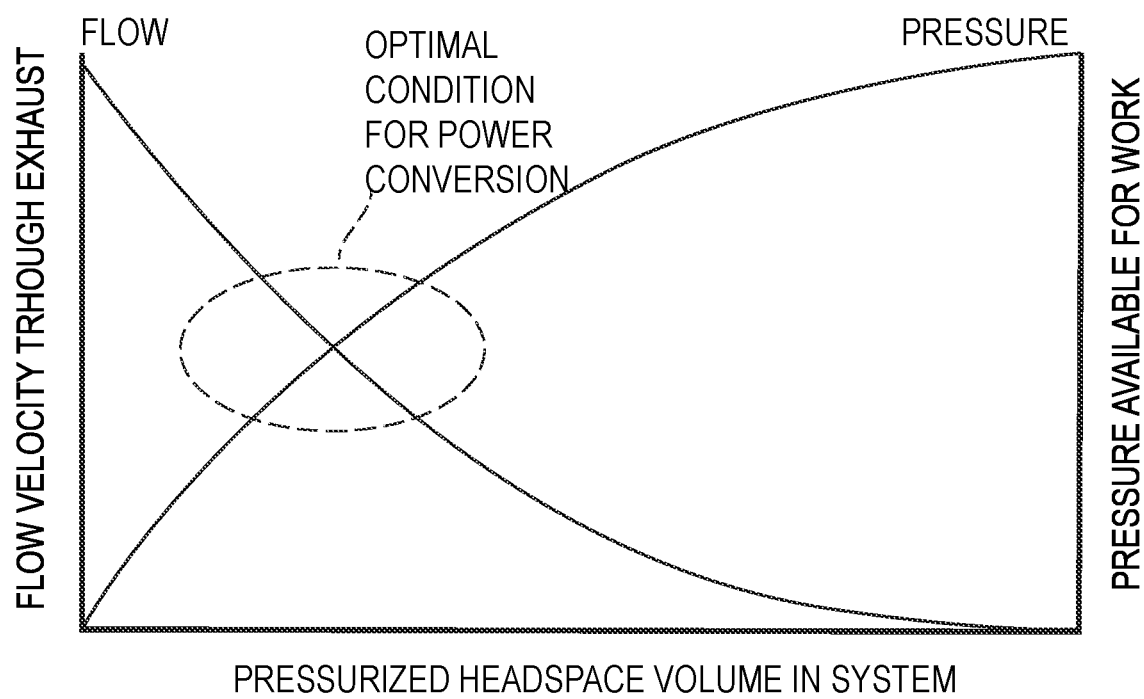
FIG. 8 is a plot of pressure and flow rate in the apparatus.

FIG. 1A is view of an exemplary first embodiment having a linear array of five inverted surge vessels or "displacement cavities" connected by a pneumatic manifold. The apparatus exemplifies a multi-stage concentrative wave energy rectifier. In this view, the perspective is from below a waterline perpendicular to and intersecting the surge vessels at, above or slightly below the top of the vessels. Each surge vessel is hollow but is capped at the top. Each vessel is shown here as a tubular structure, while the invention is not limited thereto. The piping connects the surge vessels to an expansion chamber or a series of expansion chambers. The energy is stored in the final expansion chamber(s), and may be pneumatically connected to a transducer or "convertor" that converts cumulative pneumatic pressure into stored potential energy or directly into work. The pneumatic power convertor can be a turbine, for example The concentrative arrays are not limited to linear arrays, and may be curvilinear or branched tree like arrays as shown in FIG. 8. Surge vessels are not limited to tubular sections, and may be any container capable of containing a pressure when inverted in water and partially filled with air.

The piping that connects the inlet, surge vessels, expansion chamber(s), valves and load is termed a "pneumatic manifold". While the manifold in these figures is shown between surge vessels immersed below the waterline and expansion chambers above the waterline, this position is purely to improve the readability of the drawings. Other geometries may be equivalent or provide more compact construction.

FIG. 1B is an elevation view of the first embodiment showing the arrangement of surge vessels, expansion chambers, and valves, and having an inlet for receiving air and an outlet. A waterline is shown to indicate that the surge vessels are at least mostly submerged. In fact, the surge vessels and expansion chambers can be mostly submerged and only the initial surge vessel(s) need be above the waterline. The pipework or "manifold" connecting the inlet and the exhaust is continuous, but air flow is rectified by the use of check valves associated with each of the expansion chambers as needed to prevent backflow.

FIG. 1C is a perspective view looking down on the linear array of five surge vessels and associated pipeworks. The surge vessels are positioned between serial expansion chambers in this view. Each expansion chamber has an inlet check valve and an outlet check valve.

Figure 1D:
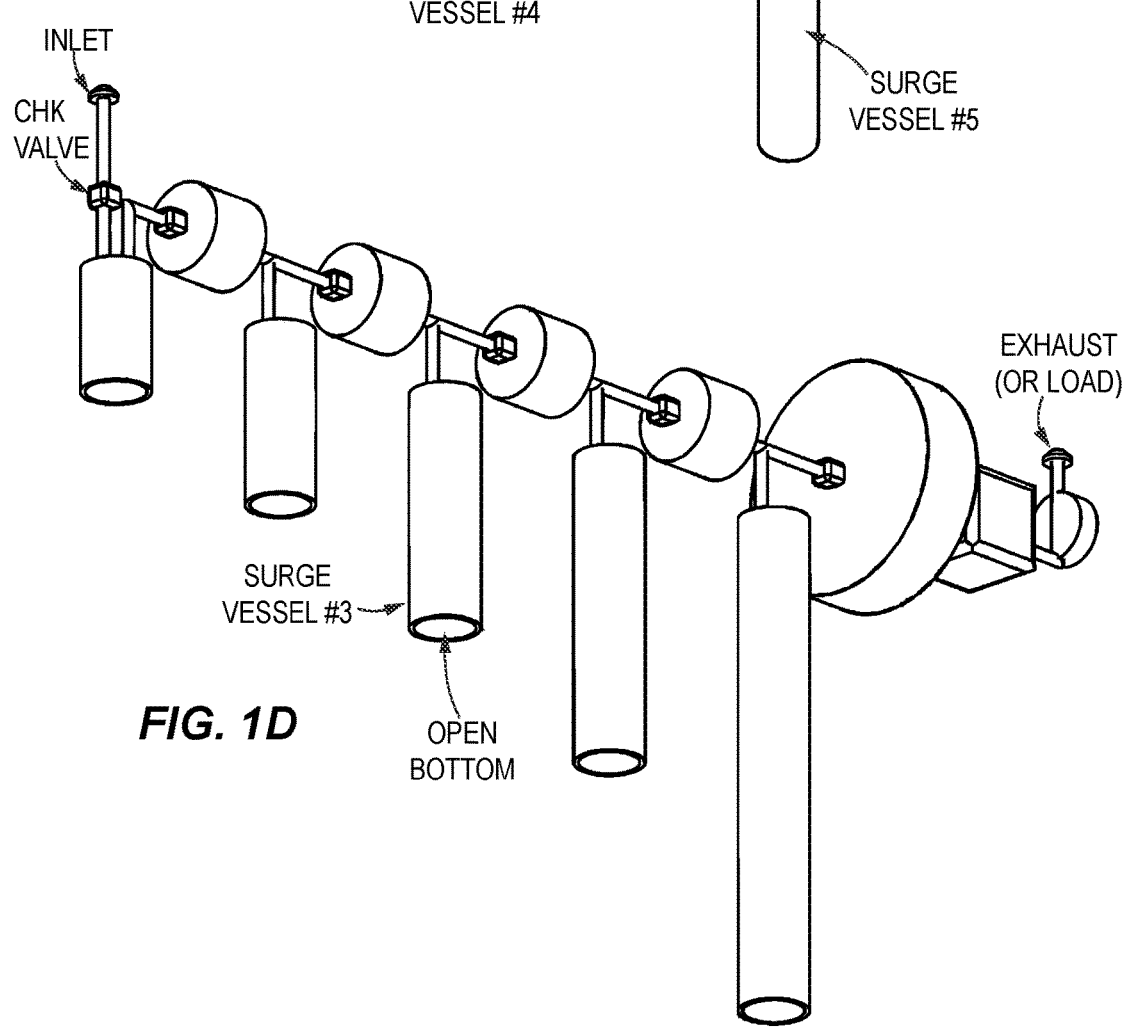
FIG. 1D is a perspective view looking up from beneath the five surge vessels. The submerged bottom of each surge vessel is in open communication with the surrounding fluid.

FIG. 1D is a perspective view looking up from beneath the five surge vessels. The submerged bottom of each surge vessel is in open communication with the surrounding fluid.

Figure 1E:
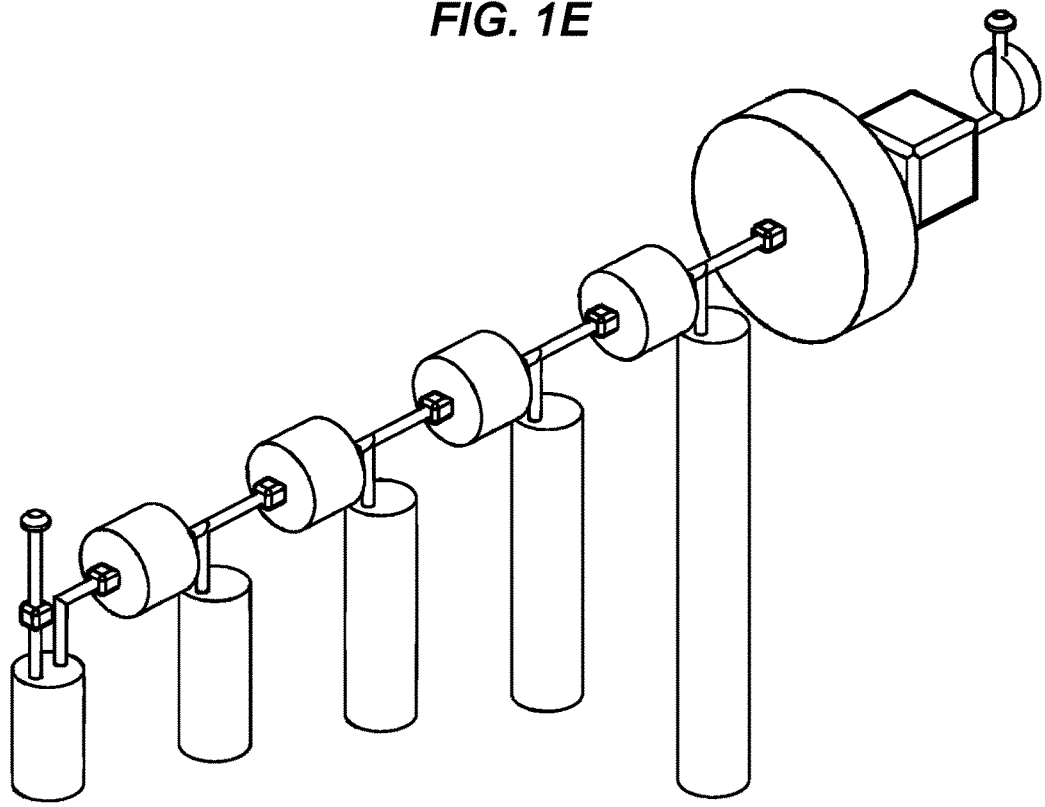
FIG. 1E is a view in perspective from the intake manifold in the foreground to an exhaust vent at the back right end of the apparatus.

FIG. 1E is a view in perspective from the intake manifold in the foreground to an exhaust vent at the back right end of the apparatus. This apparatus may be installed at a shoreline, for example, where the shoreline is subject to an ocean swell. In some exemplary installations, the smaller of the surge vessels is installed furthest from the littoral shore and the larger of the surge vessels is installed closest to the littoral shore; in other installations, the reverse is true. In some installations, all or many of the surge vessels are of the same volume, height, cross-section, width, or diameter.

The depth of the surge vessels is adjusted during installation so that the bottom openings of the vessels are submerged even at low tide.

Figure 2A:
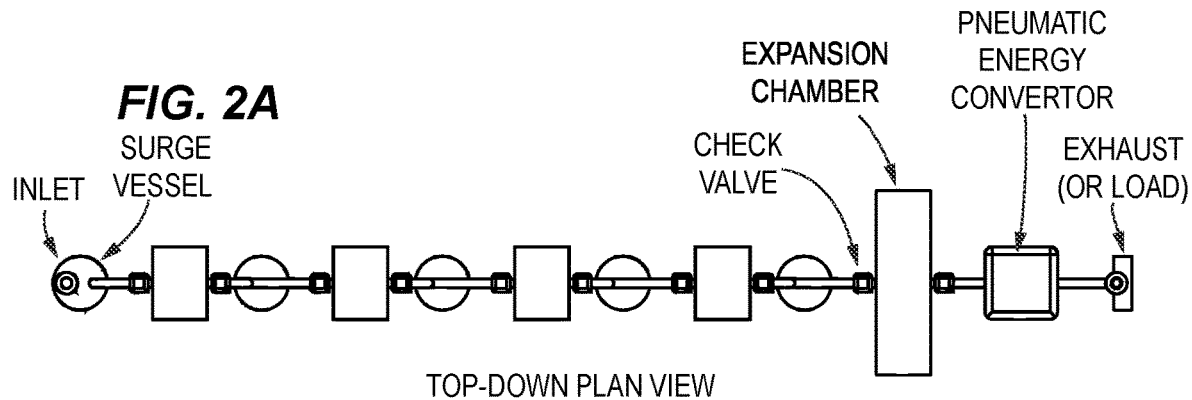
FIGS. 2A and 2B are a top-down and bottom-up plan views of a five-membered surge vessel linear array.
Figure 2B:
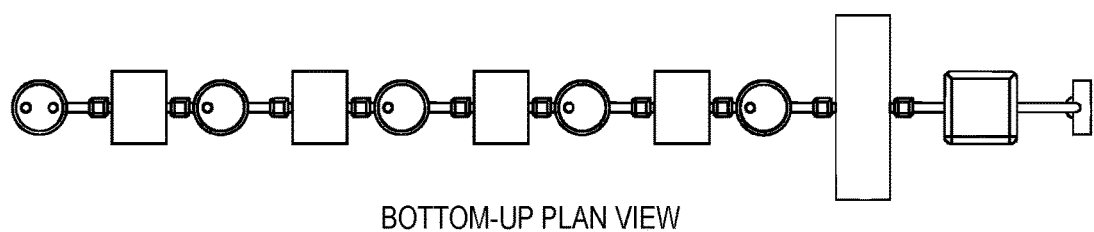

FIGS. 2A and 2B are a top-down and bottom-up plan views of a five-membered surge vessel linear array. Flow of air in this example is directed by check valves from left to right through the pneumatic manifold, towards and through the pneumatic energy convertor and on to the exhaust or to another load. The distance between the last expansion chamber and the load may be larger than shown, for example a pipe directed from a shoreline to a convertor station a few meters or a few kilometers away, although care must be taken in designing the pipework that the pressure drop over the length not exceed the available pressure at the required flow rate.

Figure 3A:
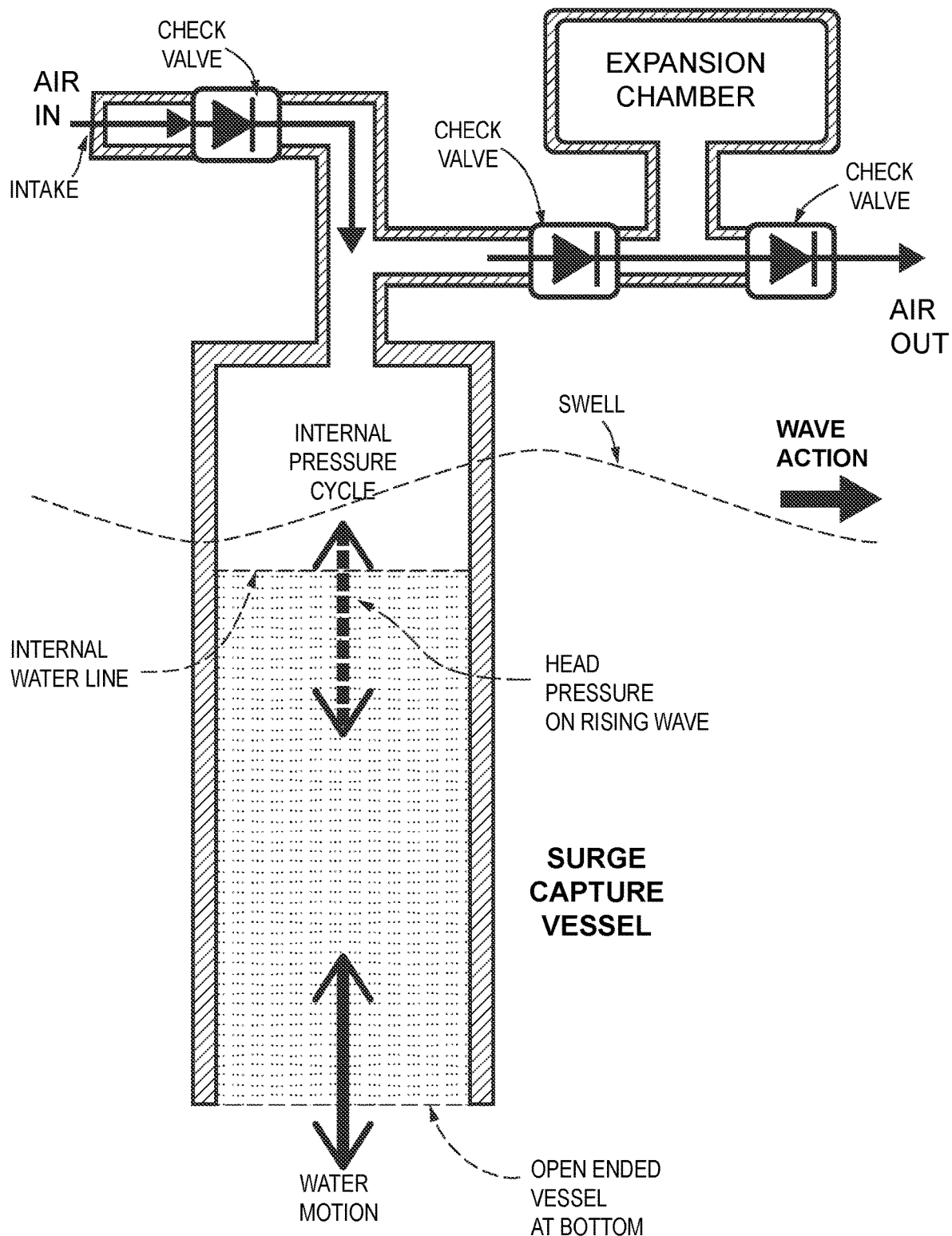
FIG. 3A is a first cutaway schematic of the internal structure of single surge vessel and introduces the concept of dynamic head pressure coupled to wave action.

FIG. 3A is a first cutaway schematic of the internal structure of single surge vessel and introduces the concept of head pressure, displacement of air to the expansion chamber through a check valve, and the linkage of pneumatic air flow to wave action through the open bottom of the surge vessel. As a swell rolls around the surge vessel, the internal water column experienced an increased pressure in proportion to the amplitude of the swell. For example, a 2 meter swell is expected to have an approximately 3 psi head pressure inside the top of the vessel. This head pressure is conveyed through a check valve and captured in an expansion chamber. Excess pressure and air moves through a second check valve (arrow, AIR OUT). Fresh air enters through an intake so that the process is repeated with each wave. Suction pressure cannot reverse the process because reverse flow is blocked by the check valves.

Figure 3B:
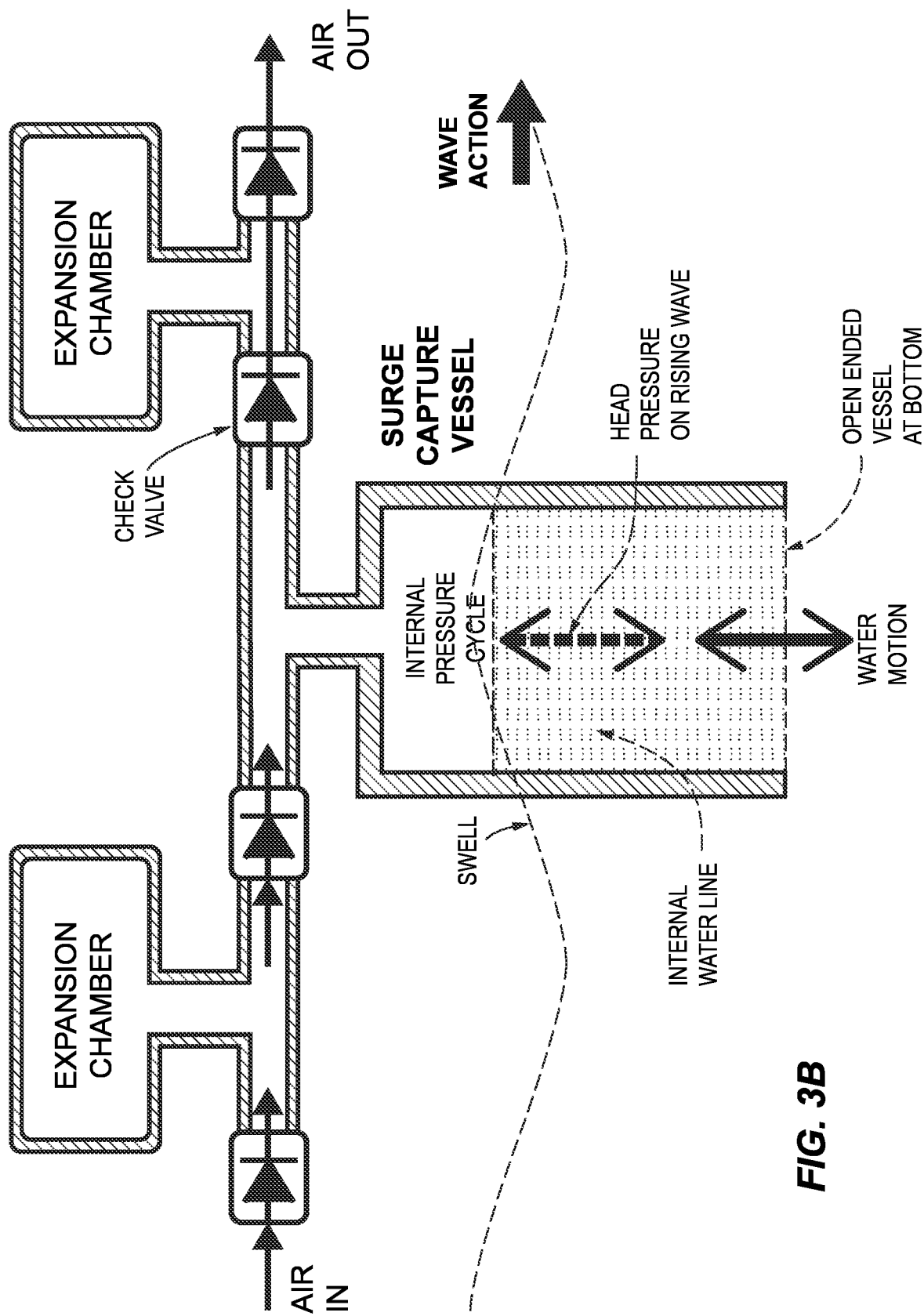
FIG. 3B is a second cutaway schematic of the internal structure of a single surge vessel in series with two expansion chambers, in which check valves rectify the coupling of displaced air to a buildup of pressure along the array.

FIG. 3B is a second cutaway schematic of the internal structure of a single surge vessel in series with two expansion chambers, in which check valves rectify the coupling of displaced air to a buildup of pressure along the array. Pressure from the first expansion chamber causes the fluid level to lower in the surge tube so that the pressure in the second expansion chamber is brought to an even higher pressure by the wave action. Multiple expansion chambers and pipeworks can be coupled to multiple surge vessels to form a concentrative array. The net effect of multiple waves is that an amplified pressure can be applied to the power convertor.

The expansion chambers are positioned above the surge vessel as shown, but alternative positions include adjacent to or below the surge vessel. In some instances the expansion chambers can share a wall or walls with the surge vessels and can be immersed or fully submerged. For example, surge vessels and expansion chambers can share a common top cap that functions as a dock or jetty that extends into the ocean, with the apparatus underneath.

FIG. 4A is a schematic showing a series of waves moving along the waterline and motions of air and water in the surge vessels and piping that leads to concentration of pneumatic pressure in the final expansion chamber. The piping of the pneumatic manifold may be in series or in parallel with the surge vessels according to the placement of check valves as configured to rectify the pneumatic flow. Energy is built up and stored in the form of compressed air in expansion chambers and controlled with a release valve, shown here in a closed position. The release valve can be a bleed valve that maintains a pressure gradient for continuous operation or can be used to seal the system and store the potential energy of the compressed air.

In FIG. 4A, internal waterlines within surge vessels I-5 correspond to an expected maximal pressure condition representing a full charge of fully pressurized air and little or no outflow.

Figure 4B:
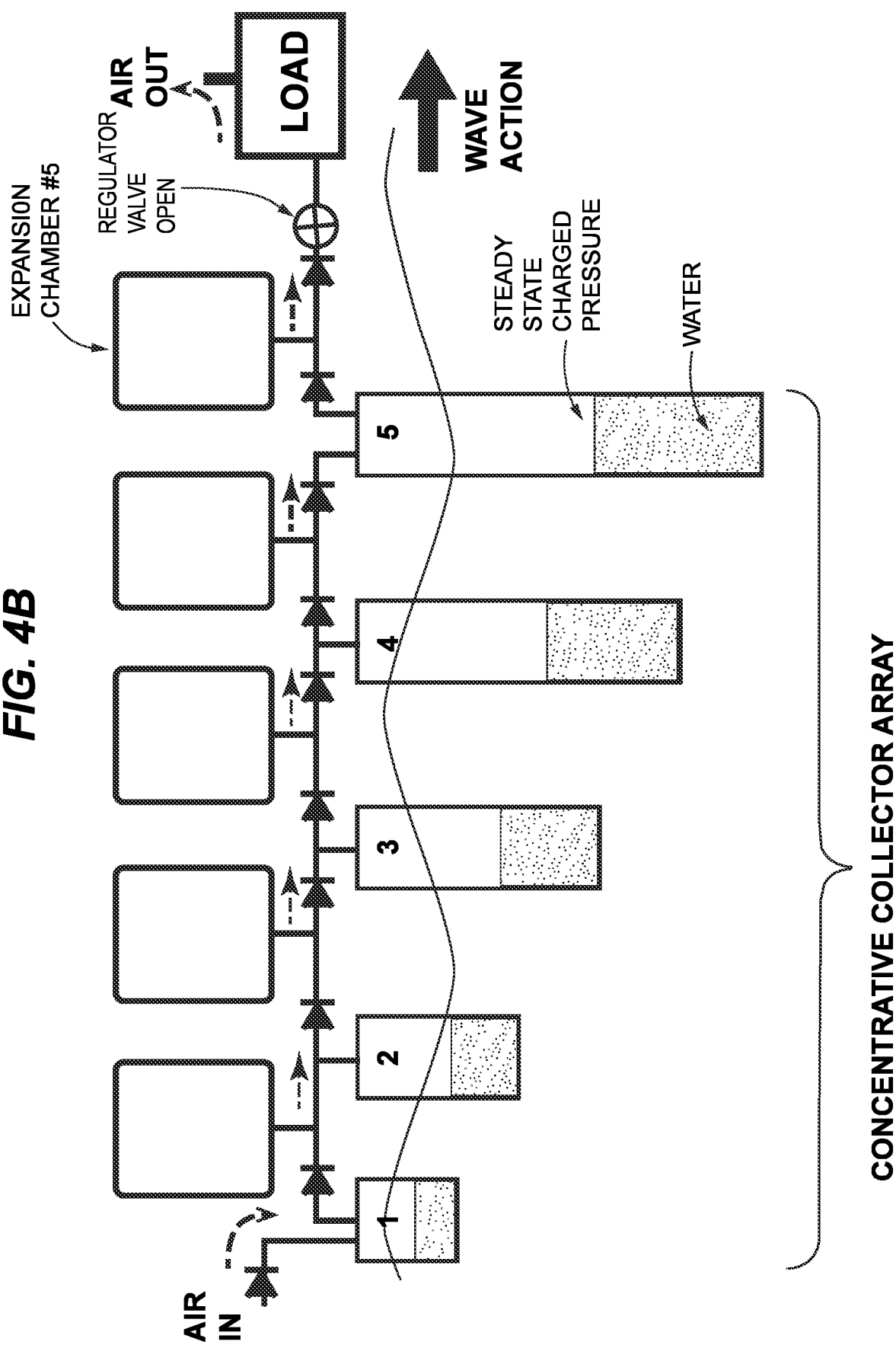
FIG. 4B is a similar schematic as FIG. 4A showing optimal state of charge. The apparatus is termed a concentrative collector array or wave energy rectifier.

FIG. 4B is a schematic as in FIG. 4A, but with a steady flow of pressurized air to a load through a release valve. The rate of flow to the exhaust is set by the regulator valve and is dependent on the load. In FIG. 4B, internal waterlines within surge vessels I-5 correspond to an expected optimal operating condition in which pressurized air is supplied as a stream to a load through a release valve or regulator.

Figure 5:
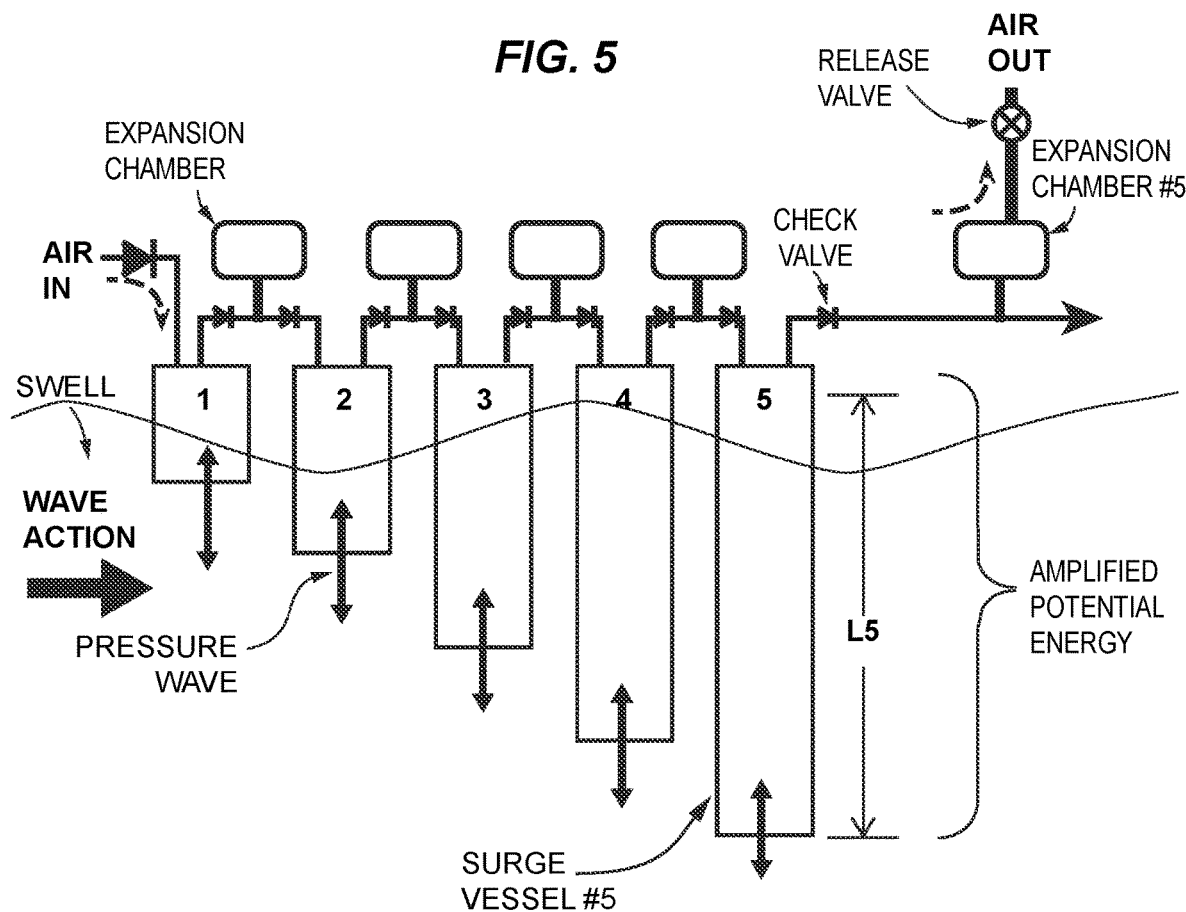
FIG. 5 illustrates a cross-section or cutaway view of an apparatus configured to develop a pressure gradient as shown in FIG. 6.

FIG. 5 illustrates a second embodiment of a wave energy rectifier and shows the dynamic motion of water rising and falling in the surge vessels that results in head pressure above the water column. Amplified potential energy is dependent on the depth at which surge vessel #5 is below the wave level. The height of surge vessel 5 at the waterline (LS) represents the maximal head pressure.

Figure 6:
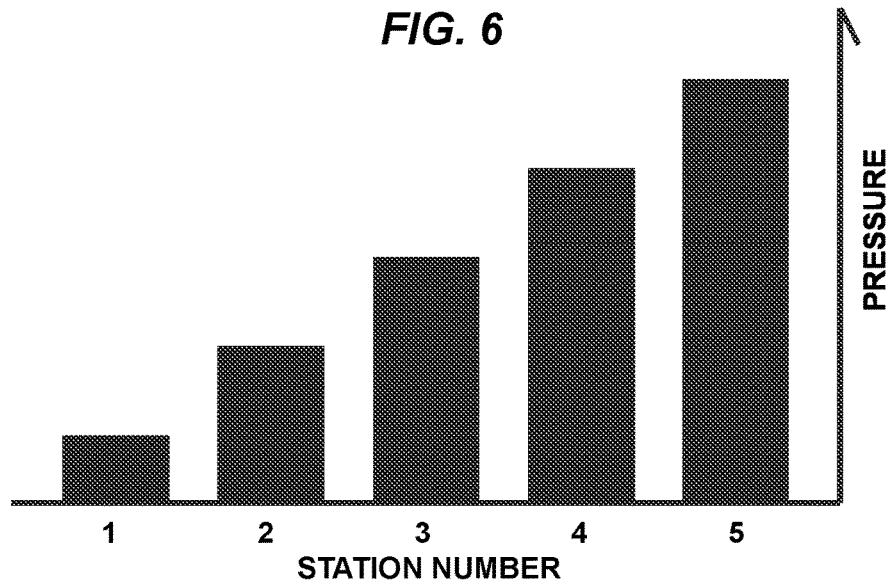
FIG. 6 is a bar graph of pressure that develops in the headspace of the surge vessels of the apparatus of FIG. 5.

FIG. 6 is a bar graph of pressure that develops in the headspace of the surge vessels. The pressure is concentrative because one-way valves are disposed on the piping to direct the flow of air toward the expansion chamber. A typical installation is designed to provide compressed air at IO to 50 psi or greater.

The pressure in concentrative because; one way check valves capture the energy created by each surge vessel into an expansion chamber, that pressure is then used to charge the following surge vessel to a higher potential at the bottom of its stroke, check valves are placed at the intake of each vessel so that higher pressure is achieved by each surge vessel in series.

Figure 7A:
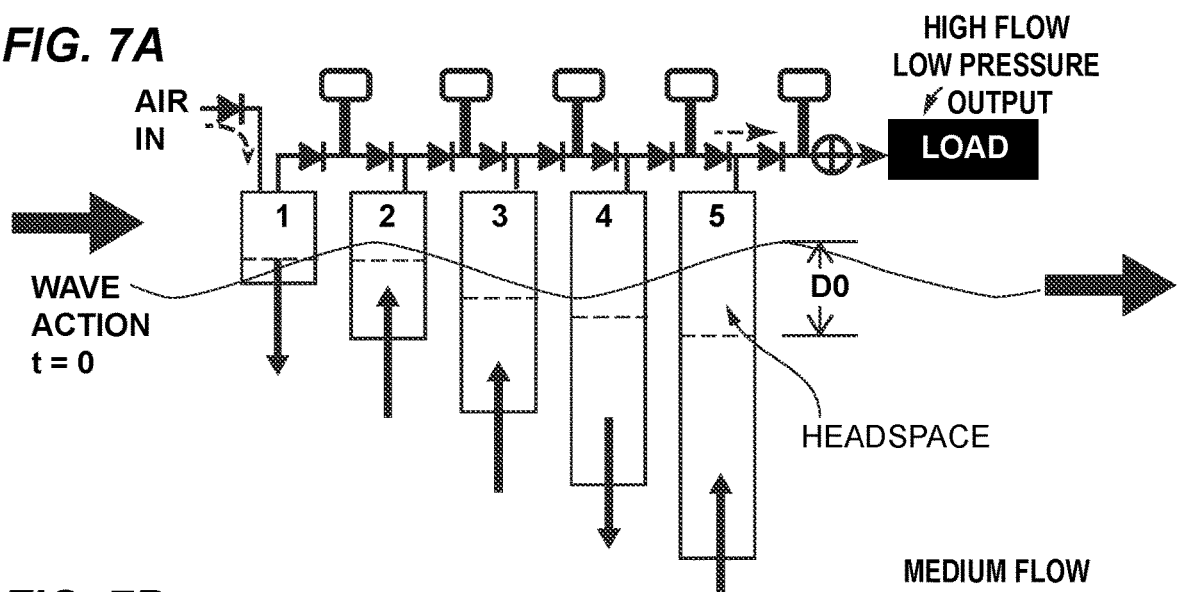
FIGS. 7A, 7B and 7C are a series of snapshot views showing an advancing waves causing directional flow of air from an inlet to the pneumatic power convertor as a function of time and progression of waves from left to right (bold arrow).
Figure 7B:
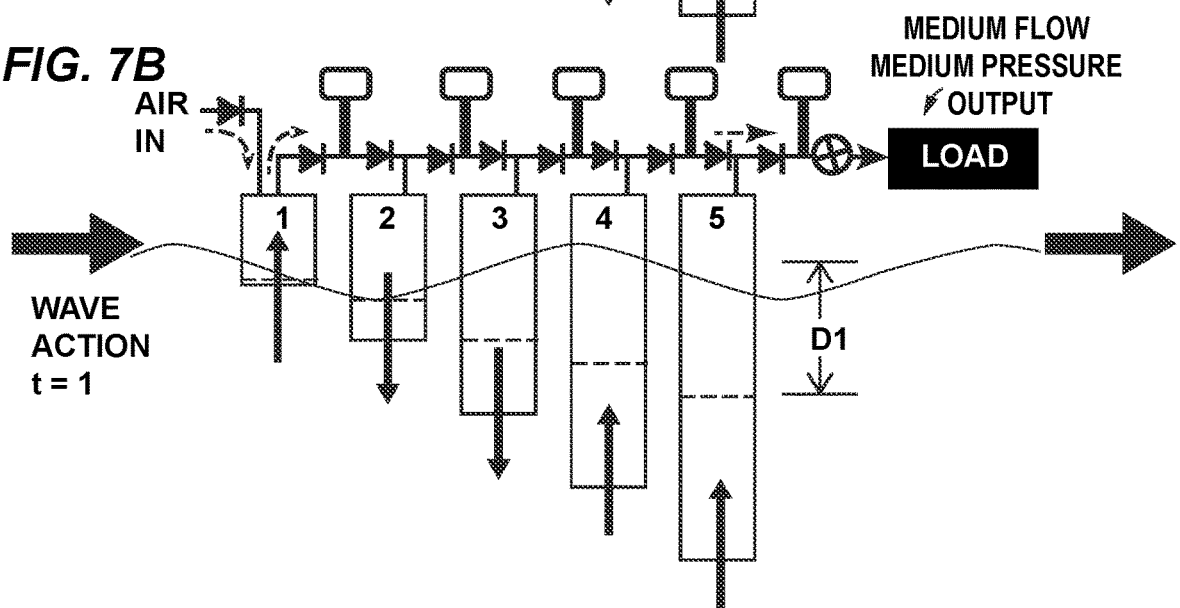

FIGS. 7A and 7B are snapshot views showing an advancing waves causing directional flow of air from an inlet to the pneumatic power convertor as a function of time and progression of waves from left to right (bold arrow). In the first view (FIG. 7A), surge vessels 2, 3 and 5 are experiencing positive pressure of a swell, and the pressure displacement will push air in the direction of the load. Surge vessel I is experiencing negative or suction pressure within the vessel volume, and will pull in air at the inlet (AIR IN) so as to be primed for a pumping action when the wave advances as shown in the next snapshot (FIG. 7B).

In FIG. 7B, the wavetop has advanced from vessel 2 to vessel 4. In this action series, surge vessels 1, 4 and 5 are experiencing positive pressure, and will push air in the direction of the load. Surge vessels 2 and 3 are experiencing negative or suction pressure within the vessel containment volume, and will pull in air at the inlet (AIR IN) and are primed for a pumping action when the wave advances. A net pumping of air at pressure is directed toward the load (as potential or kinetic energy for performing work). By this action, the water level in surge vessel 5 is pushed down and stores potential energy as head pressure within the vessel volume. The head pressure is proportional to the head height, and increases from Do to D1 as waves move through the array.

Figure 7C:
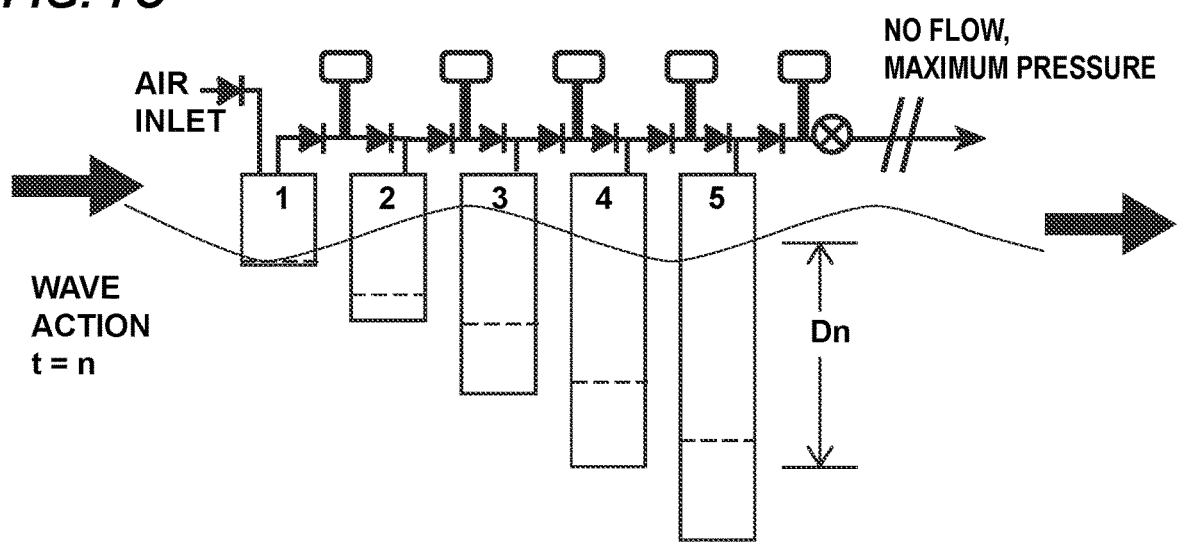

In FIG. 7C, a condition is reached, if there is no exhaust flow, in which pressure in the surge vessels and expansion chambers accumulates to a maximum. In this instance, the exhaust is blocked at the outlet. In this case, a steady state is be achieved in which the system pressure in surge vessel 5 is proportional to head height Dn. At steady state with no exhaust flow, the amount of pressure change is zero, the pressure level uVDn is constant (where u is density, Vis the displacement volume, and Dn is the head height), and a zero exhaust air condition exists. The total potential energy of the system is the volume of air times the pressure.

When exhaust flow is blocked, as with a valve, the pressure in the surge vessels and exhaust chambers is maximal, and when there is no resistance to air flow out of the system (by opening the regulator valve), pressure falls to zero. FIG. 8 illustrates a plot of system flow rate and system pressure, and shows that flow rate varies inversely with the pressure. Where the plots cross, there is an optimal condition for doing work on an external load. The graph indicates the relationship between pressure and flow in the system. Power is the combination of pressure and flow. Maximum power output is achieved by a load that matches the pressure in which maintains the best flow multiplier. The rate of flow can be maintained at the highest rate at the lowest pressure and the flow rate is restricted to the slowest rate to maintain the highest pressure. Optimal power output is found approximately where the lines on the graph intersect.

While not shown, optimal power output is also dependent on wave height and seasonal factors, and also tide. And in periods when the apparatus is storing energy without release, because the swells continue to move up and down on the surge vessels, there will be a rise and fall of pressure around an average, depending on the wave action. The apparatus is constructed to resist the maximum internal pressure and external wave action for sustained periods of time.

Figure 9:
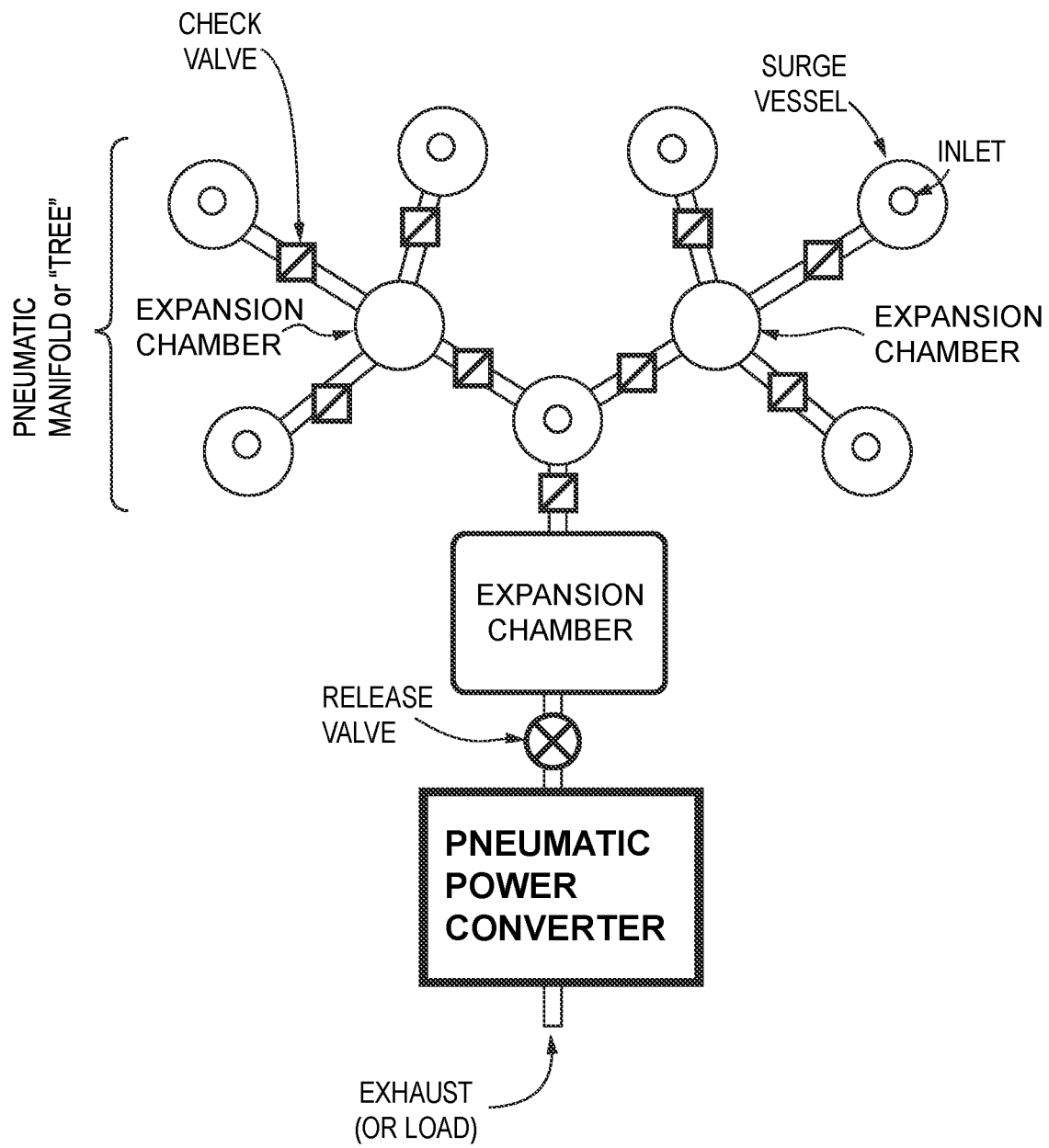
FIG. 9 shows a tree-like branching array of surge vessels coupled by a branched pneumatic manifold to an expansion chamber and pneumatic power convertor. Surge vessels may be used in parallel or in series to supply energy to a single pneumatic power convertor.

FIG. 9 shows a tree-like branching array of surge vessels coupled by a branched pneumatic manifold to a plurality of expansion chambers and a pneumatic power convertor. The exemplary tree has two main branches. From each branch, three surge vessels are connected by the pneumatic manifold to a single expansion chamber. Each of the peripheral surge vessels includes an external air intake and a check valve to prevent back flow of pressure. The surge vessels receive pressurized air from upstream surge vessels and may include an intake port with check valve. Each surge vessel may add to the pressure as wave action extends through the tree, and the branched manifold conveys the accumulated pressure to a common expansion chamber. A release valve controls the rate of bleed of pressure to a pneumatic energy convertor or load and can be adjusted so that there is always a positive pressure gradient at the intake port of the load and a release to ambient pressure at the exhaust.

It is contemplated that articles, apparatus, methods, and processes that encompass variations and adaptations developed using information from the embodiments described herein are within the scope of this disclosure. Adaptation and/or modification of the articles, apparatus, methods, and processes described herein may be performed according to these teachings.

Throughout the description, where articles and apparatus are described as having, including, or comprising specific components, or where processes and methods are described as having, including, or comprising specific steps, it is contemplated that, additionally, there are articles and apparatus that consist essentially of, or consist of, the recited components, and that there are processes and methods that consist essentially of, or consist of, the recited processing steps.

It should be understood that the order of steps or order for performing certain actions is immaterial if the embodiment remains operable. Moreover, two or more steps or actions may be conducted simultaneously.

Safe Harbor

This specification is provided in connection with a Provisional Patent Application filed with the United States Patent and Trademark Office, and as such includes informal sketches and copies of photographs showing exemplary embodiments of the invention(s). The Applicant believes that a picture is worth a thousand words, and thereby intends to disclose everything taught or suggested to one of ordinary skill in the art by the included sketches and photographs, in concert with the information otherwise disclosed herein. Applicant therefore reserves the right to articulate and teach, in words and line drawings, those features, options and uses disclosed by the sketches and photographs herein in connection with subsequent conversion of this provisional filing to a formal utility application under 37 CFR § 1.53 and 35 USC § 111(a) (or an international application) said formal application or applications having priority to this application as described under 35 USC § 119(a-e) and/or 35 USC § 365.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

Scope of the Claims

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention. Any original claims that are cancelled or withdrawn during prosecution of the case remain a part of the original disclosure for all that they teach.

I claim:

1. A concentrative wave energy convertor comprising;
a plurality of surge vessels;
a plurality of expansion chambers;
a plurality of check valves;
said plurality surge vessels stationary against wave action on a surface of water, fluidly open on the bottom, descending below the surface of water, containing an oscillating wave column which increases air pressure within the plurality surge vessel,
wherein the plurality of surge vessels, expansion chambers, and check valves are assembled in series to convert fluid wave energy into stored potential energy of compressed air by the concentrative displacement of water;
wherein each of the plurality of expansion chambers are positioned between each of the plurality of surge vessels,
wherein one of the plurality of check valves serves as an air intake that allows air to enter the first surge vessel;
wherein the remaining plurality of check valves are each positioned between each of the plurality of surge vessels and the plurality of expansion chambers, oriented to only allow air flow in one direction;
wherein the air pressure generated by wave energy upon each of the plurality of surge vessels, passes through one of the plurality of check valves, into one of the plurality of expansion chambers,
wherein the air pressure exits through each of the plurality of check valves, adding further air pressure to the potential displacement of water each of the plurality of surge vessels;
wherein the air pressure is increased further by wave energy and passes through each of the plurality of check valves into each of the plurality of expansion chambers,
wherein pressure exits through each of the plurality of check valves, adding air pressure potential displacement of water in each of the plurality of surge vessels;
the concentrative displacement is increased in pressure with each sequence of the plurality of surge vessels, check valves, and expansion chambers serves as a source, or storage, of compressed air.

2. The wave energy rectifier of claim 1, wherein the plurality of surge vessels connected series or in parallel is a linear array connected to a linear pneumatic manifold.

3. The wave energy rectifier of claim 1, wherein the plurality of surge vessels connected series or in parallel is a curvilinear array connected by a linear pneumatic manifold.

4. The wave energy rectifier of claim 1, wherein the plurality of surge vessels connected series or in parallel is a branching array connected by a branched pneumatic manifold.

5. A concentrative wave energy rectifier comprising;
a plurality of expansion chambers;
a plurality of check valves;
a plurality of surge vessels;
said plurality surge vessels are open on the bottom to allow wave energy to increase pressure in the air contained within the top of each of the plurality of vessels,
wherein the plurality of surge vessels, expansion chambers, and check valves are assembled in series to convert fluid wave energy into compressed air,
wherein one of the plurality of check valves allows air to enter into the first of the plurality of surge vessels,
wherein increased submergence by wave energy pressurizes air though one of the plurality of check valves into one of the plurality of expansion chambers,
wherein a pressurized air exit through one of the plurality of check valves, to further displace water in one of the plurality of surge vessels, wherein increased submergence by wave energy further increases the potential pressure that passes through one of the plurality of check valves, into one of the plurality of expansion chambers, wherein pressure is increased by wave energy upon each sequence of surge vessels, check valves, and expansion chambers, wherein the final vessel or chamber is used as a storage, or source, of compressed air.

6. The wave energy rectifier of claim 5, wherein the plurality of surge vessels connected series or in parallel is a linear array connected to a linear pneumatic manifold.

7. The wave energy rectifier of claim 5, wherein the plurality of surge vessels connected series or in parallel is a curvilinear array connected by a linear pneumatic manifold.

8. The wave energy rectifier of claim 5, wherein the plurality of surge vessels connected series or in parallel is a branching array connected by a branched pneumatic manifold.

9. A concentrative wave energy convertor comprising of:
a plurality of hydropneumatics chambers, open to fluid pressure on the bottom, isolated from atmospheric pressure;
a plurality of expansion chambers; and
a plurality of check valves;
wherein the plurality of chambers and valves are assembled in series to convert wave energy into stored potential energy of compressed air by the concentrative displacement of water;
wherein the plurality of expansion chambers are positioned between each of the plurality of hydropneumatic chambers,
wherein the plurality of check valves are positioned between each of the plurality of hydropneumatic chambers and the plurality of expansion chambers, oriented to only allow air flow in one direction;
wherein one of the plurality of check valves is positioned as an air inlet that allows air to enter the first of plurality of hydropneumatic chambers;
wherein the pressure generated by wave energy upon the first of the plurality of hydropneumatic chambers, passes through one of the plurality of check valves into one of the plurality of expansion chambers,
wherein the pressure exits through each of the plurality of check valves to add air pressure potential displacement of water in the next of plurality of hydropneumatic chambers;
wherein pressure is increased further by wave energy and continues through each of the plurality of check valves into each of the plurality of expansion chambers,
wherein the pressure exits through each of the plurality of check valves to add potential displacement of water to each of the plurality of hydropneumatic chambers;
the concentrative displacement continues in sequence, increasing in pressure concentrative displacement progresses—until the final chamber that serves as a source of compressed air.

10. The wave energy rectifier of claim 9, wherein the plurality of surge vessels connected series or in parallel is a linear array connected to a linear pneumatic manifold.

11. The wave energy rectifier of claim 9, wherein the plurality of surge vessels connected series or in parallel is a curvilinear array connected by a linear pneumatic manifold.

12. The wave energy rectifier of claim 9, wherein the plurality of surge vessels connected series or in parallel is a branching array connected by a branched pneumatic manifold.

13. The wave energy rectifier of claim 1 configured to store energy in the form of compressed air provided from external sources.

14. The wave energy convertor of claim 5 configured to store energy in the form of compressed air provided from external sources.

15. The wave energy convertor of claim 9 is configured to store energy in the form of compressed air provided from external sources.

* * * * *